United States Patent [19]
Presenz et al.

[11] Patent Number: 5,686,192
[45] Date of Patent: Nov. 11, 1997

[54] TRANSPARENT POLYAMIDE AND MULTI-PLY BARRIER FILMS CONTAINING SAME

[75] Inventors: Ulrich Presenz, Casa Canaschal; Manfred Hewel, Oberdorf, both of Switzerland

[73] Assignee: EMS-Inventa AG, Zurich, Switzerland

[21] Appl. No.: 778,635

[22] Filed: Jan. 3, 1997

Related U.S. Application Data

[62] Division of Ser. No. 216,886, Mar. 24, 1994, Pat. No. 5,612,446.

[30] Foreign Application Priority Data

Mar. 24, 1993 [DE] Germany ............ 43 09 534.8

[51] Int. Cl.$^6$ .......... A23C 19/16; B32B 27/08; B32B 27/34; B65D 85/76
[52] U.S. Cl. .......... 428/474.4; 264/564; 426/127; 426/160; 428/474.7; 428/475.2; 428/476.9
[58] Field of Search .......... 428/474.4, 474.7, 428/475.2, 476.9; 426/127, 130; 264/564

[56] References Cited

U.S. PATENT DOCUMENTS

| | | | |
|---|---|---|---|
| Re. 34,447 | 11/1993 | Poppe et al. | 524/606 |
| 4,424,243 | 1/1984 | Nishimoto et al. | 428/36 |
| 4,603,166 | 7/1986 | Poppe et al. | 524/606 |
| 4,801,486 | 1/1989 | Quacquarella et al. | 428/34.9 |
| 4,908,272 | 3/1990 | Harada et al. | 428/412 |
| 4,983,719 | 1/1991 | Fox et al. | 528/339 |
| 5,106,693 | 4/1992 | Harada et al. | 428/412 |
| 5,264,544 | 11/1993 | Paschke et al. | 528/349 |
| 5,346,967 | 9/1994 | Clagett et al. | 525/425 |
| 5,612,446 | 3/1997 | Presenz et al. | 528/310 |

FOREIGN PATENT DOCUMENTS

| | | |
|---|---|---|
| 0 369 808 | 5/1990 | European Pat. Off. . |
| 0 409 666 | 1/1991 | European Pat. Off. . |
| 0 411 791 | 2/1991 | European Pat. Off. . |
| 0 457 598 | 11/1991 | European Pat. Off. . |
| 43 09 534 | 8/1994 | Germany . |

*Primary Examiner*—James C. Cannon
*Attorney, Agent, or Firm*—Spencer & Frank

[57] ABSTRACT

The invention relates to a barrier layer resisting the transmission of oxygen for multi-layer barrier film characterized in that it is made of a transparent copolyamide comprising three components. The first component is hexamethylenediamine and adipic acid. The second component is hexamethylenediamine and azelaic acid, hexamethylenediamine and sebacic acid, and mixtures thereof. The third component is hexamethylene-diamine and isophthalic acid, hexamethylenediamine and terephthalic acid, and mixtures thereof. The total of all components is 100 mol %, and the ratio of the barrier effects in the barrier layer with respect to carbon dioxide and oxygen is at least 3:1.

11 Claims, No Drawings

TRANSPARENT POLYAMIDE AND MULTI-PLY BARRIER FILMS CONTAINING SAME

CROSS-REFERENCE TO RELATED APPLICATION

The present application is related to German application No. P 43 09 534.8 filed Mar. 24, 1993, and is a division of application No. 08/216,886 filed Mar. 24, 1994, now U.S. Pat. No. 5,612,446.

FIELD OF THE INVENTION

The present application provides a transparent copolyamide, which may be used as a barrier layer in multiply barrier films, particularly for cheese packaging.

TECHNOLOGY REVIEW

Multi-ply films containing polyvinylidene compounds are currently used in the packaging industry. Examples that might be cited are described in European Patent 368,808, U.S. Pat. No. 4,424,243, and U.S. Pat. No. 4,801,486. The main drawback of polyvinylidene chloride, in addition to being difficult to process and having a strong corroding effect on processing machines, is the environmental impact its disposal has due to be the release of chlorine and the possible formation of dioxins.

According to EP 457,598, the use of copolyamide 6/12 is also known. One great disadvantage of this copolyamide material is its oxygen barrier property, which is affected by environmental humidity and decreases as the humidity increases. EP 0 409 666 describes copolyamide compositions polymerized from isophthalic acid, adipinic acid, alternatively terephthalic acid, hexamethylenediamine and m-xylylene diamine having good gas barrier properties. Nevertheless this specification does not show any ratio higher than 3:1 in the barrier resistance against $CO_2$ and $O_2$, nor how to minimize the effect of humidity on these resistances.

Blends having three or more polyamides, including preferably, partly aromatic polyamides, allow relatively good barrier properties to be obtained. The disadvantages of the blends of three or more components, by comparison with copolyamides, are the problems with granulation, the great expense for testing each separate component, and the additional extrusion step, which increases production cost considerably, adding to the significantly higher cost for raw materials.

Moreover, the field of food packaging is in need of a barrier film that demonstrates good processing properties, does not have any corrosive properties, is halogen free, and which has barrier properties which do not deteriorate if humidity is absorbed.

SUMMARY OF THE INVENTION

The invention provides a transparent copolyamide comprising three components. The first component is hexamethylenediamine and adipic acid (hexanedioic acid). The second component is hexamethylenediamine and azelaic acid (nonanedioic acid), hexamethylenediamine and sebacic acid (decanedioic acid), and mixtures thereof. The third component is hexamethylene-diamine and isophthalic acid (1,3-benzenedicarboxylic acid), hexamethylenediamine and terephthalic acid (1,4-benzenedicarboxylic acid), and mixtures thereof.

It is therefore an object of this invention to overcome each of the above-mentioned disadvantages. A particular object of the invention is to provide a transparent copolyamide having special barrier behavior as is required for barrier films used in the field of food packaging, especially cheese packaging.

An advantage of the invention is to provide barrier films having a ratio of carbon dioxide barrier to oxygen barrier properties in the range of 3:1 to 5:1 or higher.

DETAILED DESCRIPTION OF THE INVENTION

A transparent copolymer suitable to prepare a barrier layer, and multi-ply barrier films including such a barrier layer according to the invention are provided by the copolyamide films of the present invention. These copolyamide films are characterized in an advantageous manner by good biaxial stretchability, high shrinkage of the stretched material, a high degree of transparency, sufficient flexibility and compatibility. These copolyamide films may be produced, without difficulty, by coextrusion in combination with other layers of thermoplastically processable polymers, for example, supporting layers, sealing layers or protective layers, and may be used as multi-ply barrier films.

The transparent copolymer according to the present invention is a transparent copolyamide containing the following components:

I Hexamethylenediamine and adipic acid present from about 15 to 75 mol %;

IIa Hexamethylenediamine and azelaic acid and/or;

IIb Hexamethylenediamine and sebacic acid together present from about 15 to 65 mol %; and IIIa Hexamethylenediamine and isophthalic acid and/or IIIb Hexamethylenediamine and terephthalic acid together present from about 10 to 70 mol %, with the total quantity being 100 mol %, of course.

A preferred composition according to the present invention comprises about 15 to 60 mol % of I;

about 15 to 55 mol % of IIa and/or IIb; and about 10 to 45 mol % of IIIa and/or IIIb.

A particularly preferred composition according to the present invention comprises about 33 to 55 mol % of I;

about 15 to 55 mol % of IIa or IIb; and about 10 to 30 mol % of IIIa or IIIb.

The components of each copolyamide composition must total 100 mol %, respectively. It is apparent that the total acid and diamine must be present at a nearly equimolar ratio.

The copolyamides according to the invention may contain, among others, common additives such as chain regulators, stabilizers, anti-foaming agents, and crystallization accelerators.

The production of copolyamides according to the invention is accomplished using the melt-condensation method in a known manner. The production of barrier layers, in a multi-ply barrier film, for example, for testing and examination purposes, may be accomplished by means of film-blowing extrusion in a known manner.

Depending on intended use of the copolyamide, the preferred range of relative viscosity of the copolyamides according to the invention (measured as a 0.5% solution in m-cresol at 23° C.) lies between about 1.75 and 2.5. However, either higher or lower degrees of viscosity may also be used.

Also depending on the intended use, other barrier layers and a plurality of further layers may be used together with a copolyamide layer according to the present invention for a multi-ply product. Other preferred polymer layers are protective and supporting layers which give defined functional characteristics to the multi-ply product. Known sealing layers may be used in order to render the multi-layer compound sealable by means of hot sealing. Known layers of adhesion promotors may also be used advantageously. Preferred polymers for protective and supporting layers are those made of polyamides, polyolefins or polyesters. Advantageous adhesion promotor layers are functionalized polyolefins, i.e., they are provided with functional groups. Sealing layers consists, in an advantageous manner, of low-melting polymers. So-called ionomers are preferred. The production of multi-ply film products is advantageously accomplished with coextrusion equipment.

The following Examples elucidate the invention for the benefit of those of ordinary skill in the art, without limiting the broad scope of the invention.

TABLE 1

The composition of the barrier layers in Examples 1-3.
Composition of Copolyamides in Barrier Layers

| Example No. | I Mol % | IIa Mol % | IIIa Mol % | IIIb Mol % |
|---|---|---|---|---|
| 1 | 38 | 52 | 10 | — |
| 2 | 55 | 15 | 30 | — |
| 3 | 38 | 52 | — | 10 |

IIIa hexamethlyenediamine and isophthalic acid;
IIIb hexamethylenediamine and terephthalic acid.

TABLE 2

Barrier behavior at 0 and 85% relative humidity

| | | Barrier Behavior* | | |
|---|---|---|---|---|
| Example No. | Environ. Humidity | Oxygen ** | Carbon dioxide ** | Ratio *** |
| 1 | 0% rH | 65 | 204 | 3.1 |
|   | 85% rH | 40 | 469 | 11.7 |
| 2 | 0% rH | 48 | 144 | 3.0 |
|   | 85% rH | 24 | 209 | 8.7 |
| 3 | 0% rH | 75 | 228 | 3.0 |
|   | 85% rH | 45 | 363 | 8.1 |
| Comparative | 0% rH | 120 | 400 | 3.3 |
| Example | 85% rH | 200 | 800 | 4.0 |

* Blown film thickness 50 μm
** $cm^3/m^2$ day bar
Measuring devices:
85% rH    Mocon Oxtran Twin
0% rH     Lissy L 100
*** Ratio of carbon dioxide to oxygen barrier
(rH: relative humidity)

COMPARATIVE EXAMPLE

Copolyamide CF 6S (Ems-Chemie AG, Zürich) a copolyamide on a caprolactam and laurinlactam base.

The barrier layers according to the invention in Example 1-3 show the significantly improved oxygen barrier with respect to the comparative example and the essentially better ratio of carbon dioxide to oxygen barrier.

In a field test, in which packaged cheese was stored in a cooling chamber, the film material containing the copolyamide from Example No. 1 proved to be successful. After six months' storage, no mildew formed and no swelling occurred due to the carbon dioxide formed during ripening of cheese.

Table 3 is a comparison of a commercially used cheese package having polyvinylidene chloride as barrier layer and a multi-ply barrier film, according to the invention, containing the copolyamide from Example No. 1 as barrier layer in combination with an inner ionomer sealing layer, an outer protective layer of polyolefin, and two adhesive layers surrounding the barrier layer.

TABLE 3

Multi-layer packaging films:
0% rH/85% rH

| Barrier Layer | | Barrier Behavior | | |
|---|---|---|---|---|
| Type | Thickness μ | oxygen ** | carbon-dioxide ** | Ratio *** |
| PVDC | 10 | 160/175 | 800/800 | 5/4.6 |
| Example 1 | 10 | 208/207 | 1323/2610 | 6.4/12.6 |

** $cm^3/m^2$ day bar
*** Ratio of carbon dioxide to oxygen barrier.
Measuring devices:
85% rH    Mocon Oxtran Twin
0% rH     Lissy L 100

The multi-ply barrier film having a copolyamide barrier layer according to the invention makes possible a sufficient oxygen barrier as well as an excellent barrier ratio of carbon dioxide to oxygen.

A special advantage of copolyamides as a barrier layer compared to barrier films containing polyvinylidene chloride is the independence of the oxygen barrier from environmental humidity. Further advantages are good flexibility, the lack of corrosive properties and, above all, freedom from the release of halogens.

The oxygen barrier of the copolyamide barrier layers according to the invention may be further improved in the dry state by adding known nucleation substances, for example, polyamide 22 or mineral nucleation substances such as talc. The commonly known nucleation substances are used in commonly known concentrations. Moreover, due to this measure, a stable barrier level is more rapidly obtained after film extrusion.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a multi-ply film including a barrier layer, the improvement comprising said barrier layer consisting of a transparent polyamide derived from a composition consisting of
   (a) a first component comprising hexamethylenediamine/adipic acid and present from about 15 to 75 mol %;
   (b) a second component selected from the group consisting of hexamethylenediamine/azelic acid, hexamethylene/sebacic acid, and mixtures thereof and present from about 15 to 65 mol %; and
   (c) a third component selected from the group consisting of hexamethylenediamine/isophthalic acid, hexamethylenediamine/terephthalic acid, and mixtures thereof, and present from about 10 to 70 mol %, said first, second and third components totalling 100 mol %, said copolymer exhibiting barrier values having a ratio of at least 3:1 with respect to carbon dioxide and oxygen, and said copolyamide having a relative viscosity between about 1.75 and 2.50 measured as a 0.5% solution in m-cresol at 23° C.

2. The multi-ply film according to claim 1, including at least one barrier layer and at least one additional layer selected from the group consisting of adhesive layers, supporting layers, protective layers, and sealing layers.

3. The multi-ply film according to claim 2, wherein said at least one additional layer comprises a supporting layer.

4. The multi-ply film according to claim 3, wherein the supporting layer is selected from the group consisting of polyamide, polyolefin and polyester.

5. In a process for preparing a multi-ply film according to claim 1, the improvement comprising producing said multi-ply film by film-blowing coextrusion.

6. A transparent copolyamide barrier layer in a multi-ply film, said barrier layer having been derived from a composition consisting of the following components:

(a) a first component comprising hexamethylenediamine/ adipic acid and present from about 15 to 75 mol %;

(b) a second component selected from the group consisting of hexamethylenediamine/azelaic acid, hexamethylenediamine/sebacic acid, and mixtures thereof, and present from about 15 to 65 mol %; and (c) a third component selected from the group consisting of hexamethylenediamine/isophthalic acid, hexamethylenediamine/terephthalic acid, and mixtures thereof, and present from about 10 to 70 mol %, said first, second, and third components totaling 100 mol %, and said barrier layer exhibiting barrier properties having a ratio of at least 3:1 with respect to carbon dioxide and oxygen.

7. The barrier layer according to claim 6, wherein said barrier layer consists of:

(a) said first component present from about 15 to 60 mol %;

(b) said second component present from about 15 to 55 mol %; and (c) said third component present from about 10 to 45 mol %.

8. The barrier layer according to claim 6, wherein said barrier layer consists of:

(a) said first component present from about 35 to 55 mol %;

(b) said second component present from about 15 to 55 mol %; and (c) said third component present from about 10 to 30 mol %.

9. A multi-ply film including at least one barrier layer according to claim 6, and at least one additional layer selected from the group consisting of adhesive layers, supporting layers, protective layers, and sealing layers.

10. The multi-ply film according to claim 9, wherein said at least one additional layer comprises a supporting layer.

11. The multi-ply film according to claim 9, wherein said supporting layer is selected from the group of polyamide, polyolefin and polyester.

* * * * *